Jan. 5, 1943.	T. A. BRYSON	2,307,107
CENTRIFUGAL EXTRACTOR
Filed April 15, 1939	4 Sheets-Sheet 1

INVENTOR:
TANDY A. BRYSON
BY Bruno C. Lechler
ATTORNEY.

Jan. 5, 1943.   T. A. BRYSON   2,307,107
CENTRIFUGAL EXTRACTOR
Filed April 15, 1939   4 Sheets-Sheet 2

INVENTOR:
TANDY A. BRYSON
ATTORNEY.

Jan. 5, 1943.　　　T. A. BRYSON　　　2,307,107
CENTRIFUGAL EXTRACTOR
Filed April 15, 1939　　　4 Sheets-Sheet 3

INVENTOR:
TANDY A. BRYSON
BY Bruno C Lechler
ATTORNEY.

Jan. 5, 1943.　　　　T. A. BRYSON　　　　2,307,107
CENTRIFUGAL EXTRACTOR
Filed April 15, 1939　　　　4 Sheets-Sheet 4

INVENTOR:
TANDY A. BRYSON
BY Bruno Lechler
ATTORNEY.

Patented Jan. 5, 1943

2,307,107

UNITED STATES PATENT OFFICE 2,307,107

CENTRIFUGAL EXTRACTOR

Tandy A. Bryson, Troy, N. Y., assignor to American Machine and Metals, Inc., New York, N. Y., a corporation of Delaware Application April 15, 1939, Serial No. 268,104

18 Claims. (Cl. 210—76)

The invention relates to centrifugal extractors having a removable cover for the extractor basket, means for removing the cover from the centrifugal, and means for locking the cover to the basket and the centrifugal spindle.

The invention also relates to centrifugal extractors having a removable basket with means for locking in place both the removable cover and the removable basket and means for removing both the removable basket and the removable cover and holding them in spaced relative position.

My invention is particularly adapted to the handling of materials that require a cover to retain them in the basket such as when the surplus cutting oil is to be removed from lathe turnings. Such baskets are often, though not necessarily, made removable and the extracted material is then dumped frequently by inverting the basket. In such cases there is no inwardly extending top flange to the basket which often is the frustrum of a cone. The basket cover must be anchored to the basket firmly enough to resist the large uplifting force generated by the liquid in the material as the centrifugal force drives the liquid to the outside of the basket; yet it must be readily removable.

The basket cover is necessarily heavy to withstand these strains and the locking means must be substantial to resist them. On all but very small extractors power means are usually provided to lift off the cover. When there is in addition a removable basket to be removed and unloaded it is very convenient to have the cover unlocked from the basket, the cover and the basket lifted, the cover suspended and held out of the way while the basket is being lifted and dumped and returned to the extractor all in one operation. Such an arrangement is shown in Patent 2,099,863, granted to E. L. Miller on November 23, 1937.

That patent shows a locking mechanism including radial bolts that engage the cover and the basket and also the cover and the extractor spindle.

The object of my invention is to provide a lifting beam which holds the cover rigidly and from which the basket is suspended while it is being removed.

A further object of my invention is to provide locking devices operated by a single control on a cover, so that when the cover is locked to the basket it is unlocked from the lifting beam or vice versa.

A further object of my invention is to provide an annular cover for an open top extractor basket with locking bars approximately tangential to the inner opening of the cover, all actuated by a hand wheel encircling the inner opening of the cover. The outer ends of the locking bars engage the cover and the basket while the inner ends engage the cover and a collar on the spindle which projects up through the opening in the cover.

A further object of my invention is to provide such a hand wheel concentric with the cover that not only actuates tangential bars to lock the cover both to the basket and to the extracor spindle but also automatically engages the dependent flange of a basket-lifting arm that is aligned over the extractor spindle when the hand wheel unlocks the cover from the basket.

A further object of my invention is to provide cover-lifting means in the form of a lifting member that comes down vertically upon the extractor spindle.

A further object of my invention is to provide a T-shaped cover and basket-lifting device, the basket cover being lifted by the stem of the T, the removable basket by the horizontal ends of the T.

A further object of my invention is to provide a basket cover with a central opening, two similar flanged collars, one attached to the spindle and the other attached to the lifting device, jointly operated, engaging devices spaced about the central opening of the cover that engage either the lifting or the spindle flange.

A further object of my invention is to provide the basket spindle with an aligning end projecting beyond the top of the cover; a T-shaped lifting device with a hollow stem that when lowered is aligned by the spindle tip, and locking means on the cover that will engage either the T-shaped lifting device or the basket spindle.

Other objects and advantages and novel features will be obvious from the accompanying description when taken in connection with the drawings.

Figure 1:
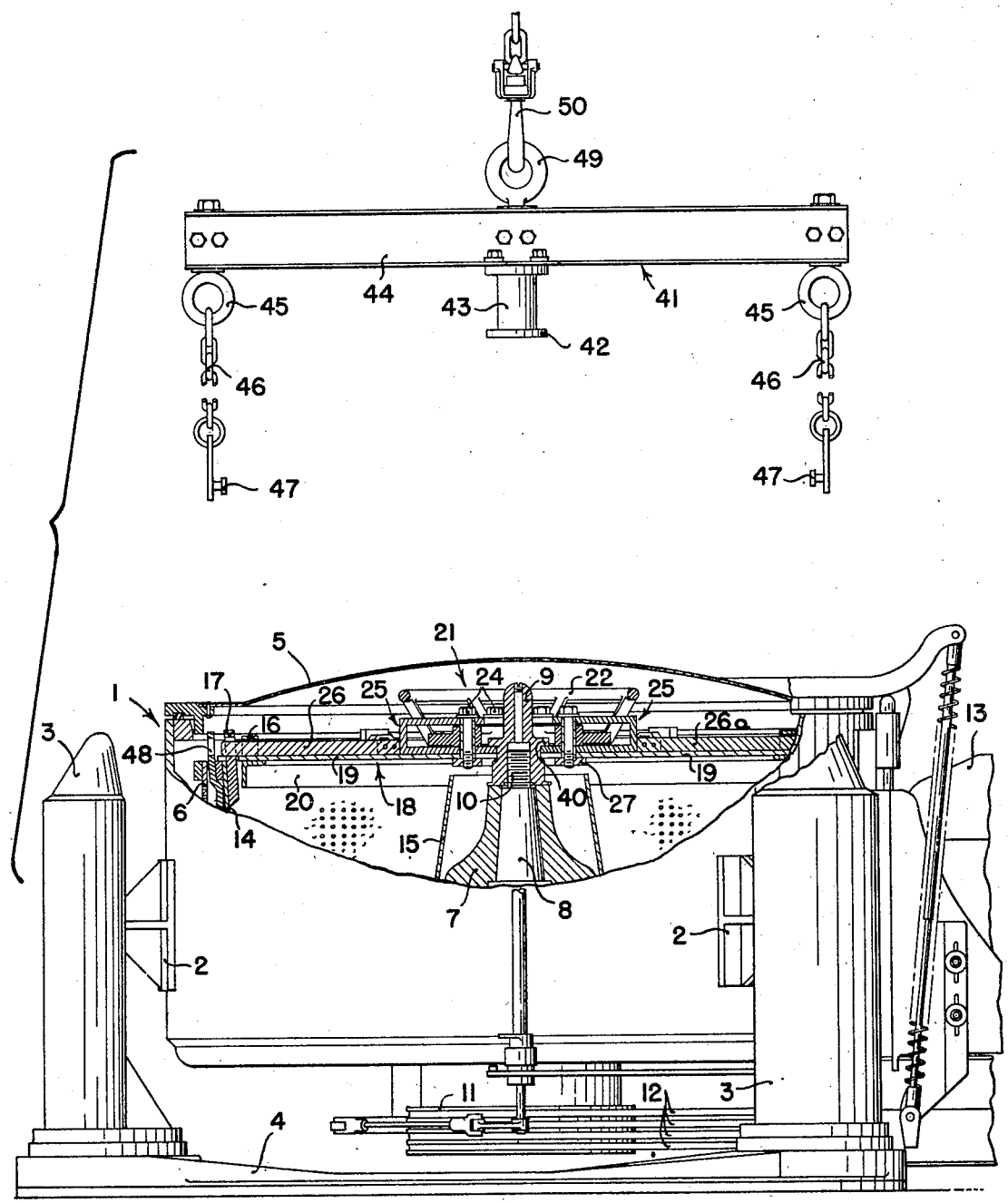
Figure 1 is an elevation partly in section taken along lines 1—1 in Figure 3, of an extractor equipped with a removable basket, a basket cover, and lifting means adapted to pick up and separate the two.

1 indicates generally an extractor case containing a basket 6 whose hub is attached to the revolving spindle 8.

The extractor casing 1 is supported on hangers 2 and the entire revolving mechanism is carried by the casing 1. The casing is suspended through hangers 2 from the posts 3 which are attached to a base 4. The machine may be equipped with an outer cover 5 carried by the casing 1 enclosing the basket 6 which revolves with spindle 8 but does not come out so is referred to as the fixed basket. This fixed basket 6 has a hub 7 fitted to the spindle 8 and retained thereon by a nut 9 which fits on the threaded extension 10 of spindle 8.

Hereinafter this basket is referred to as a fixed basket. If the invention is applied to an extractor with a removable basket, the removable basket 14 is supported in the fixed basket.

The spindle is driven by a pulley 11, belts 12, from a motor 13 carried by the casing 1. This construction is similar to that shown in the patent granted to E. L. Miller on November 23, 1937, bearing Patent Number 2,099,863, and so will not be described in detail.

In the preferred form shown the material to be treated is carried in a removable basket 14. The removable basket is annular in shape, the conical inner wall 15 surrounding the fixed basket hub 7. The removable basket 14 is held in place by a cover generally indicated as 18 which engages in a manner to be described both the ears 17 on the basket 14 and a flange 40 on the spindle nut 10.

Cover 18 consists of an annular plate 19 that has a circular angle 20 attached to the lower side. This reinforces the rim of the plate, distributes the stresses of the locking mechanism, and facilitates locating the cover. The edge of the plate 19 has cutout portions allowing ears 17 to project up through and also serving to angularly orient the cover on the basket. Near ears 17, the cover carries guides 16 through which slide the locking bars 26. At their inner end locking bars 26 carry the forked casting 25 through which pass studs 24 on which pivot the inner ends of the locking bar. Studs 24 pass through the flange 23 of the hand wheel generally indicated as 21. This hand wheel has a rim 22 that encircles the inner opening of the cover. The hand wheel is not attached to the cover but the studs 24 on which the locking bars 26 are pivoted pass through the opening in plate 19, close to the edge of that opening, and terminate in a ring 27 whose outer diameter is great enough to prevent lifting the hand wheel 21 away from the cover 18.

One latch bar 26a carries an extension that bears against two adjustable stops. Thus the angular motion of hand wheel 21 may be limited to that required to latch and unlatch the cover.

The latch bars 26 are not radial but approximately tangential to the hand wheel flange 23. Each latch bar head 25 has two prongs, 36 and 38, carrying respectively fingers 37 and 39. Hole 35 extends through both prongs and stud 24 passes through it.

Figure 5:
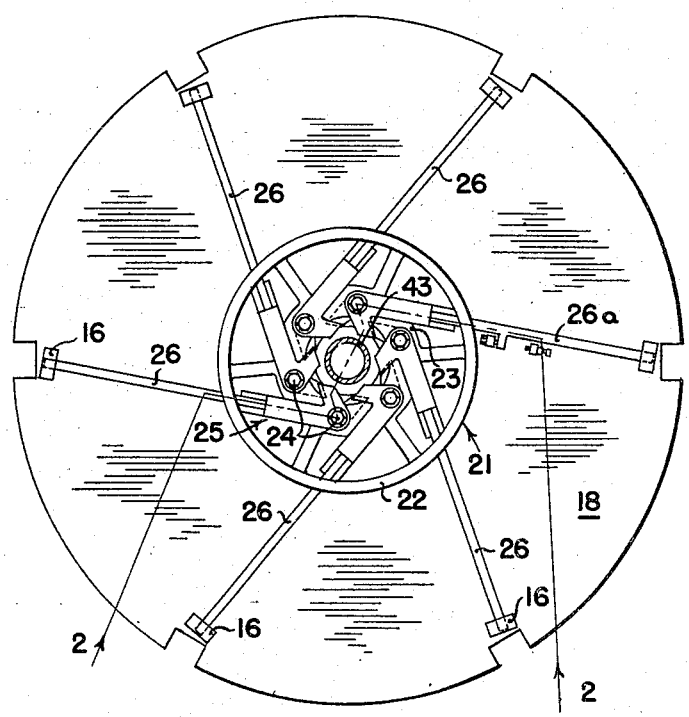
Figure 5 is a top view similar to Figure 3 along line 5—5 in Figure 2 showing the bars withdrawn, the top lifted from the removable basket, and the inner ends of the bars engaging the lifting mechanism.
Figure 6:
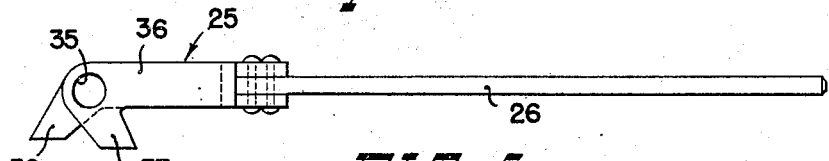
Figure 6 is a top view of one of the latch bars shown in Figures 3, 4, and 5.
Figure 7:
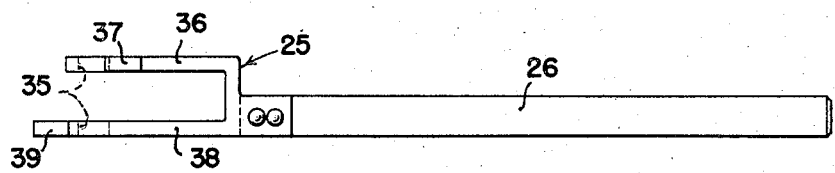
Figure 7 is an elevation of the latch bar shown in Figure 6.

It will be noted that fingers 37 and 39 are not superimposed. When the hand wheel 21 is in the position shown in Figure 3 the bars 26 engage ears 17 and the lower fingers 37 are engaging the under side of flange 40 and the fingers 35 are withdrawn outside the central opening in the cover. When the hand wheel 21 is moved to the other limit of its movement, as shown in Figure 5, the upper fingers 35 are engaged over the top of flange 42 of lifting member 43. Member 43 forms the hollow stem of a lifting T-41 consisting of I-beam 44 and casting 43. This I-beam 44 carries rings 45 from which depend lifting chains 46. Studs 47 on the ends of the chains 46 are adapted to engage bail 48 of the basket 14.

The cross beam 44 may be lifted by the hook 50 of any hoist or other lifting device that engages the ring 49 attached to the cross beam 44.

In operating the herein-described mechanism, starting with the apparatus at rest in the position shown in Figure 1, outer cover 5 is opened, the lifting T-41 is lowered until the upward extending part of nut 9 enters hollow lifting member 43, aligning lifting T-41 with the basket.

When lifting T-41 takes bearing on the basket, flange 42 on the lifting member 43 will be directly over flange 40 on the nut 9.

Figure 3:
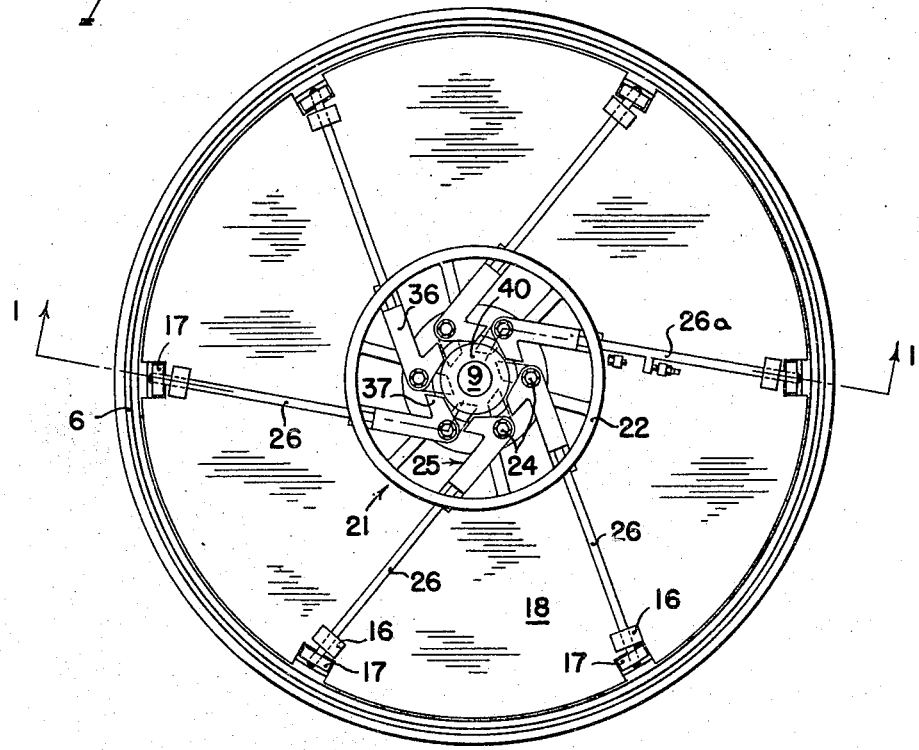
Figure 3 is a top view of the removable basket nested in the fixed basket, cover in place, and bars in place locking the cover to the basket at the rim and to the extractor spindle in the center.
Figure 4:
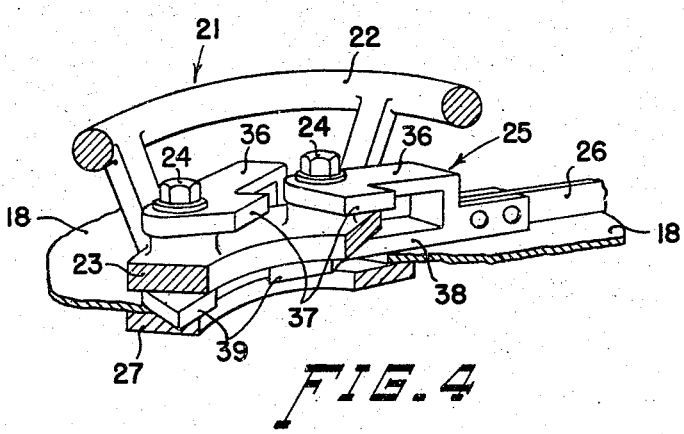
Figure 4 is a broken away section, in perspective, of a part of the basket cover shown in Figure 3 to show more clearly the central locking mechanism.

The operator then grips hand wheel 21, turns it counterclockwise from the position shown in Figure 3 to that shown in Figure 5. In so doing each of the locking bars 26 has been withdrawn from the ear 17 attached to the removable basket, freeing the cover from the basket. The fingers 39 have passed out from under flange 40, thus freeing the cover from the extractor spindle, and upper fingers 37, not thus far active, have moved out over the flange 42 of the lifting mechanism.

Thus, by a single turn of hand wheel 21 two latches have been unlatched and a third latch engaged.

The operator now lifts lifting T-41 with cover 18 attached. The basket 14 is filled with material to be extracted, such as chips retaining cutting oil, the lifting T is lowered, replacing the cover 18, the hand wheel is turned, disengaging the lifting T and locking the cover to both the basket and the spindle.

Cover 5 is closed, the material in the extractor is treated in any desired manner and finally the liquid is extracted by bringing the basket to speed. Basket 14 may be perforate or imperforate. Centrifugal force pushes both the liquid and the chips outward, the liquid creates hydrostatic pressure upwards against the cover 18 which cannot lift, being anchored to both the basket and the spindle. The liquid is thrown off under the rim of the cover 18 into outer casing 1.

Figure 2:
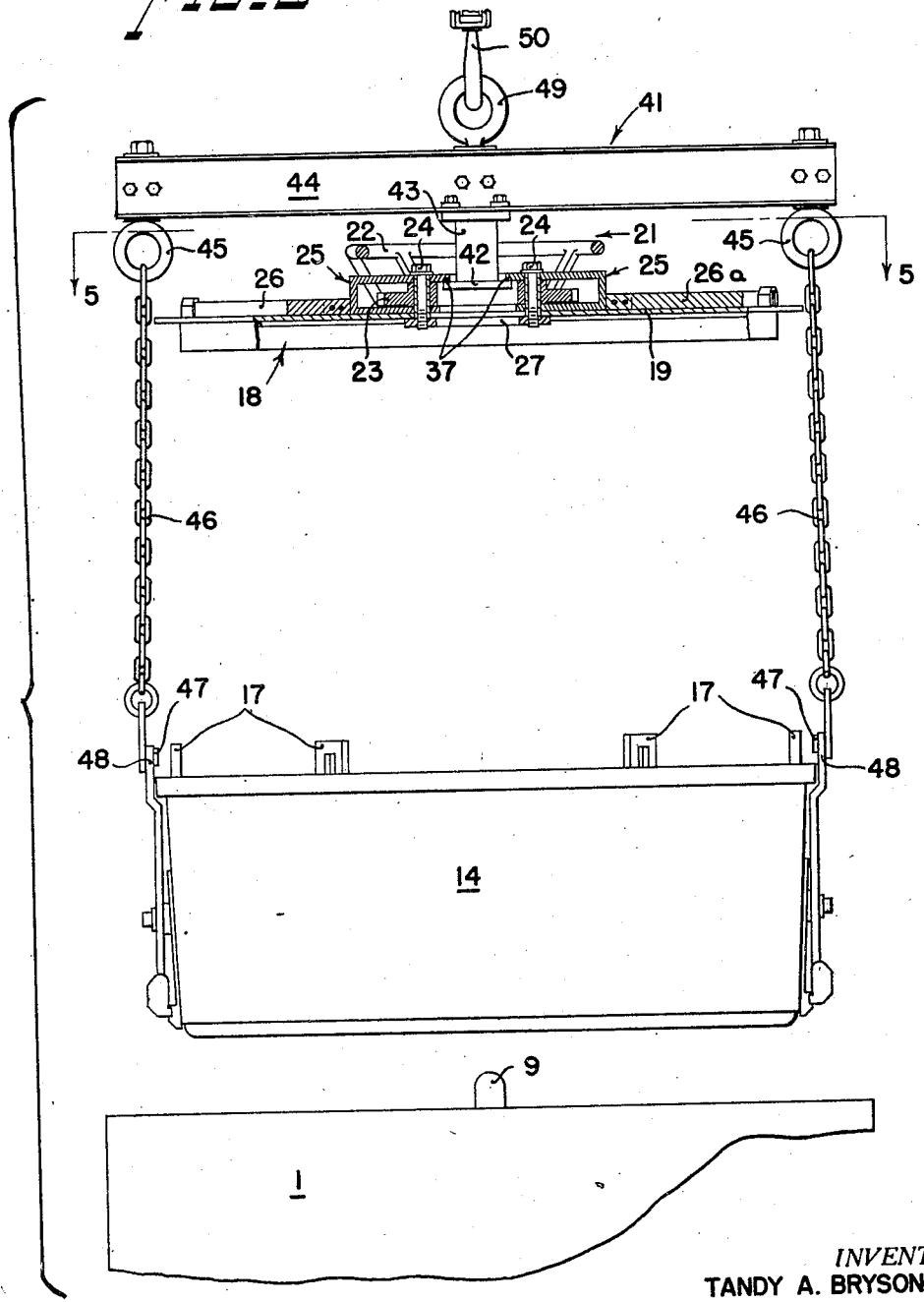
Figure 2 is an elevation, partly in section, along lines 2—2 of Figure 5, of the same extractor, removable basket, and cover as shown in Figure 1 after the cover and the basket have been attached to the lifting mechanism and lifted out of the extractor.

When the centrifugal extractor comes to rest the cover 18 is lifted in the manner previously described except that studs 47 are also engaged in the slots of the bail 48 attached to basket 14. When the slack in chains 46 has been taken up the hoist will lift the basket out in the manner shown in Figure 2. The basket can now be transferred to any desired location, disengaged from the chains, or dumped while suspended from the chains, in the same manner as described in Patent 2,099,863 and the same basket or another basket, can be picked up. Both basket 14 and cover 18 are replaced in the manner already described.

If a number of removable baskets 14 are to be used in the same machine, some being unloaded, others being loaded, while still another is in the machine, it is not necessary to pay any attention to the cover which remains suspended from the lifting T-41, and does not require the operator's attention as in Patent 2,099,863.

The invention in its broader aspects is not limited to the specific mechanism shown and described but departures may be made therefrom within the scope of the accompanying claims without departing from the principles of the invention and without sacrificing its chief advantages.

What I claim is:

1. A centrifugal extractor including, in combination, an extractor spindle and a basket open at one end centered on the spindle, a removable cover for closing the basket opening, mechanical means for removing the cover from the basket, locking means carried by the cover for locking the cover to the basket, other locking means carried by the cover for locking it to the lifting means, and means connecting the two locking means so that the engagement of one locking means disconnects the other.

2. A centrifugal extractor including, in combination, an extractor spindle, a centrifugal basket rigidly attached to and centered on the spindle, a removable open ended container fitting into the basket, a removable cover serving both to close the removable container and to hold it within the basket, locking means carried by the cover adapted to lock the cover to the centrifugal basket, cover lifting means, other locking means carried by the cover for locking the cover to the lifting means to open the container and permit its removal from the basket and means connecting the two locking means so that the engagement of one locking means automatically disengages the other locking means.

3. A centrifugal extractor including, in combination, an extractor spindle, a centrifugal basket rigidly attached to and centered around the spindle, a removable container fitting into the basket through which the spindle projects, a removable cover for the removable container and locking means carried by the cover adapted to lock the cover to the centrifugal spindle thereby holding the container within the basket, cover lifting means, other locking means carried by the cover for locking the cover to the lifting means to open the container and permit its removal from the basket, and means connecting the two locking means so that the engagement of one locking means automatically disengages the other locking means.

4. A centrifugal extractor including, in combination, an extractor spindle supporting an extractor basket, a removable cover for the extractor basket, a vertically moving lifting device having a horizontal circumferential flange, a plurality of bolts carried by the cover adapted to be moved horizontally to engage over the flange, bolt-advancing means carried by the cover for advancing all bolts uniformly to lock the cover to the lifting means in a fixed plane.

5. A centrifugal extractor including, in combination an extractor spindle supporting an extractor basket, a removable cover for the basket, a vertically movable lifting device having a projecting horizontal flange, a plurality of bolts carried by the cover adapted to move horizontally and tangentially to the flange of the lifting means and to engage over the flange in one position so that the bolts serve both to aline the lifting device and the cover and to lock the cover tightly to the flange of the lifting device and without the possibility of tilting.

6. In a centrifugal extractor, in combination, an extractor basket, a spindle supporting the basket and extending up through the basket, a removable cover for the extractor basket, the spindle projecting through a hole in the cover, lifting means for the cover including a tubular member that is guided by the spindle into abutting position against the cover, locking means carried by the cover adapted to engage the outside of the tubular member locking the cover to the lifting means.

7. In a centrifugal extractor, in combination, a removable container, a spindle supporting the removable container, a removable cover for the container, an axially symmetrical lifter engaging device carried by the removable cover, a lifter for lifting the cover off the container and the cover and container off the spindle, the lifter comprising a frame having a portion adapted to be engaged by the device on the cover and container lifting devices having lost motion which are carried by the frame and other portions adapted to engage the container rim at points symmetrical to the cover engaging devices, so that upon lifting the frame the cover will be picked up first, and then the container, and both carried away from the spindle in spaced relation to each other.

8. In a centrifugal extractor, in combination, a removable container, a spindle supporting the removable container and extending up through it, a removable cover for the container having a hole through which the spindle projects, axially symmetrical lifter engaging devices carried by the removable cover, a lifter for lifting the cover off the container and the cover and container off the spindle, adapted on approach to the extractor to be guided by the spindle to aline lifter and container and cover, the lifter comprising a frame having a portion adapted to be engaged by the devices on the cover, container-lifting device having lost motion carried by the frame adapted to engage the container rim, the container lifting devices having lost motion that permits engaging both the container and cover lifting devices, but, upon lifting the lifting device, the cover will be picked up first, then the container, and both are carried away from the spindle in spaced relation to each other.

9. In a centrifugal extractor, in combination, a spindle supporting and extending into an extractor basket, a removable container fitting into the extractor basket, a removable cover for the container having a hole through which the extractor spindle extends, a lifting device having a hole, a guide pin extending beyond the spindle which enters the hole in the lifting device and alines it as the lifting device approaches and seats on the cover, horizontal bolts carried by the cover adapted in one position to lock the cover to the extractor basket by extending into the wall of the extractor basket and in another position to lock the cover to the seated lifting device.

10. In a centrifugal extractor, in combination, a spindle supporting and extending through an extractor basket, a horizontal flange near the top of the spindle, a removable container fitting into the extractor basket, a removable cover for the container having a hole through which the spindle extends, a lifting device having a hole and a horizontal flange, a guide pin extending beyond the flange on the spindle end which enters the hole in the lifting device, as it approaches, alining it as it seats on the cover, horizontal bolts carried by the cover adapted in one position to lock the cover to the basket by extending under the spindle flange and in another to attach the cover to the lifting device by extending over the horizontal flange on the lifting device.

11. In a centrifugal extractor, in combination, a spindle supporting and extending through an extractor basket, a horizontal flange near the top of the spindle, a removable container fitting into the extractor basket, a removable cover for the container having a hole through which the spindle extends, a lifting device having a hole and a horizontal flange, a guide pin on the spindle extending beyond the flange on the spindle which enters the hole in the lifting device as it approaches, alining it, horizontal bolts carried by the cover adapted in one position to lock the cover to the basket by extending under the spindle flange and also locking the cover to the basket near its rim, and in another position adapted to attach the cover to the lifting device by extending over the horizontal flange on the lifting device unlocking the cover from the basket rim and spindle flange.

12. In a centrifugal extractor having a basket and a spindle supporting the basket and extending up through the basket, in combination, a cover for the basket having a central opening, a horizontal flange on the part of the spindle which extends up above the cover, a manually movable ring on the cover surrounding the spindle, bolts carried by the cover and moved in unison by the ring, one end of each bolt extending under the flange on the spindle when the ring is moved in a direction to lock the cover to the spindle against the upward thrust of a load in the basket when the machine is running.

13. In a centrifugal extractor having a basket and a spindle supporting the basket and extending up through the basket, in combination, a cover for the basket having a central opening, a horizontal flange on the part of the spindle which extends up above the cover, a manually movable ring on the cover surrounding the spindle, bolts carried by the cover and moved in unison by the ring, one end of each bolt locking the cover to the extractor basket near its rim, the other end of each bolt extending under the flange on the spindle, depending on the position of the ring.

14. In a centrifugal extractor in combination, an extractor basket, a centrifugal spindle supporting the extractor basket and extending up through it, a horizontal flange on the spindle and a guide pin extending beyond the flange, an extractor cover having an opening allowing it to pass over the spindle flange, a lifting device having a hollow body surrounded by a projecting horizontal flange adapted to be engaged by the guide pin and guided into alined contact with the spindle flange, a manually movable ring supported by the cover, sliding bars supported by the cover and the ring extending in one position of the ring under the flange on the spindle, and in another position of the ring extending over the flange on the hollow body, the movable ring sliding the bars in unison into one engagement as they are withdrawn from the other engagement, thereby locking the cover to either the spindle or the hollow body.

15. In a centrifugal extractor in combination, an extractor basket having a rim, a centrifugal spindle supporting the extractor basket and extending up through it, a horizontal flange on the spindle and a guide pin extending beyond the flange, an extractor cover having an opening allowing it to pass over the spindle flange, a lifting device having a hollow body surrounded by a projecting horizontal flange adapted to be engaged by the guide pin and guided into alined contact with the spindle flange, a manually movable ring supported by the cover, sliding bars supported by the cover and the ring extending in one position of the ring under the flange on the spindle and also locking the cover to the rim of the basket, and in another position of the ring extending over the flange on the hollow body, the movable ring sliding bars in unison into one engagement and out of the other thereby locking the cover to either spindle or hollow body.

16. A centrifugal machine having, in combination, a spindle, a seat for a horizontal bolt on the spindle, a basket carried by the spindle, a removable container in the basket, a cover for said container, a device for lifting the cover and the container from the basket, the device having a seat adapted to be engaged by a horizontal bolt means for attaching the device to the container, horizontal locking bolts carried by the cover, each bolt in one position locking the cover both to the basket and to the seat on the spindle thus holding the cover and the container in place in the basket, manually operated means on the cover for moving all locking bolts in unison out of locking engagement with the basket and the spindle and into locking engagement with the lifting device, this movement locking the cover to the lifting device and unlocking the cover from the basket.

17. A centrifugal machine of the underdriven type having, in combination, a centrifugal basket into which the shaft extends, a horizontal flange on the spindle, a guide pin on the spindle extending beyond the spindle, a cover for the basket having an opening that passes over the spindle flange, a track on the cover concentric with the spindle, a hand wheel moving in the track, bars passing through a guide on the cover and connected to the hand wheel, a lifting device including a tubular member having a projecting flange at its lower end that is guided by the pin into juxtaposition with the spindle flange, a projection on each bar adapted to pass under the spindle flange, another projection on each bar adapted to pass over the lifting flange, said two sets of projections being so spaced on the bars that as the hand wheel is moved one set of projections or the other is in locking position and the other set of projections is in disengaged position.

18. A centrifugal machine of the underdriven type having a removable covered container adapted to be lifted by a hoist and dumped by tilting the container at a distant location while supported on the hoist which also supports the cover, in combination, a shaft, a centrifugal basket supported thereon, a removable container in the basket, two pivots on the container for tiltably supporting it when out of the basket, container suspension means attached to the pivots and extending above the container while it is seated in the basket, a cover for the basket which also holds the container in place in the basket, lifting means adapted to lift successively the cover and the container from the basket, the lifting means including a frame with spaced elements for attachment to the container suspension bars, and a cover-lifting element having a lower surface adapted to bear on the cover in three or more points symmetrical to the spindle axis, locking mechanism carried by the cover adapted to lock the cover to the lifting element at these three points in one position of the locking mechanism and to the basket in the other position, so that, whenever the basket cover is locked to the lifting device, the cover is necessarily unlocked from the basket and the container is free to be lifted out of the basket supported in a manner that permits dumping by turning the basket on its pivots and upon replacing the basket in the machine, the lifting mechanism cannot be disengaged from the cover without locking the cover to the basket and thereby retaining the container and its contents in the basket.

TANDY A. BRYSON.